(12) United States Patent
Leech

(10) Patent No.: US 8,462,943 B2
(45) Date of Patent: Jun. 11, 2013

(54) BANDWIDTH EFFICIENT METHOD AND SYSTEM FOR OBSCURING THE EXISTENCE OF ENCRYPTION IN A COMMUNICATIONS CHANNEL

(75) Inventor: Marcus D. Leech, Smith Falls (CA)

(73) Assignee: Rockstar Consortium US LP, Plano, TX (US)

( * ) Notice: Subject to any disclaimer, the term of this patent is extended or adjusted under 35 U.S.C. 154(b) by 0 days.

(21) Appl. No.: 13/269,674

(22) Filed: Oct. 10, 2011

(65) Prior Publication Data
US 2012/0027204 A1 Feb. 2, 2012

Related U.S. Application Data

(63) Continuation of application No. 12/345,186, filed on Dec. 29, 2008, now Pat. No. 8,050,404.

(51) Int. Cl.
*H04L 9/00* (2006.01)
*H04L 9/28* (2006.01)
*H04L 29/06* (2006.01)

(52) U.S. Cl.
USPC ................................ 380/42; 380/28; 713/153

(58) Field of Classification Search
USPC ...................... 380/42, 28; 713/153
See application file for complete search history.

(56) References Cited

U.S. PATENT DOCUMENTS

| | | | |
|---|---|---|---|
| 6,445,797 B1 | 9/2002 | McGough | |
| 2003/0191952 A1* | 10/2003 | Anderson et al. | 713/189 |
| 2007/0005672 A1* | 1/2007 | Yushiya | 708/250 |
| 2007/0064946 A1 | 3/2007 | Ohkubo et al. | |
| 2007/0150543 A1 | 6/2007 | Fong et al. | |
| 2008/0222204 A1 | 9/2008 | Iizuka | |
| 2009/0046856 A1 | 2/2009 | Mitchell | |
| 2009/0254794 A1* | 10/2009 | Malik et al. | 714/776 |
| 2009/0323938 A1 | 12/2009 | Schneider | |

OTHER PUBLICATIONS

International Search Report and Written Opinion dated Mar. 9, 2010 for International Application No. PCT/CA2009/001763, International Filing Date Dec. 3, 2009 consisting of 11 pages.

\* cited by examiner

*Primary Examiner* — Aravind Moorthy
(74) *Attorney, Agent, or Firm* — Christopher & Weisberg, P.A.

(57) ABSTRACT

A system, method, and network interface obscures the existence of data encryption in a communication network is provided. A set of characters is generated by using a set of encryption keys as an input to a pseudo-random function. Each character corresponds to an index value. The encrypted data is divided into a plurality of parts. Each part is sectioned into a plurality of groups. Each group of the plurality of groups is encoded by mapping the group to a character in the set of characters according to its corresponding index value. The mapped characters are transmitted through the communication network.

25 Claims, 4 Drawing Sheets

BANDWIDTH EFFICIENT METHOD AND SYSTEM FOR OBSCURING THE EXISTENCE OF ENCRYPTION IN A COMMUNICATIONS CHANNEL

CROSS-REFERENCE TO RELATED APPLICATION

This application is a continuation of U.S. patent application Ser. No. 12/345,186, filed Dec. 29, 2008, entitled BANDWIDTH EFFICIENT METHOD AND SYSTEM FOR OBSCURING THE EXISTENCE OF ENCRYPTION IN A COMMUNICATIONS CHANNEL, the entirety of which is incorporated herein by reference.

STATEMENT REGARDING FEDERALLY SPONSORED RESEARCH OR DEVELOPMENT n/a

FIELD OF THE INVENTION

The present invention relates generally to a method and system for encrypting data and more specifically to a method and system for obscuring the existence of data encryption in a communication channel while efficiently allocating bandwidth.

BACKGROUND OF THE INVENTION

Traffic flows in a modern large-scale network may often be subjected to ill-considered policy-based mechanisms intended to "shape" that traffic. Often, such policy-driven traffic shaping is detrimental to encrypted flows, even when such flows would ordinarily not get "shaped" if not for the encryption.

Furthermore, in some global regions, traffic that is encrypted is often subjected to more scrutiny by invasive surveillance techniques than would be the case if the traffic wasn't encrypted. In effect, the encrypted traffic, even if it is "innocuous," can attract undue attention merely because of the encryption.

At many places in the modern Internet, particularly near the network edge, traffic-shaping technology has been designed to automatically detect encrypted flows and treat these flows differently according to local policy. Such treatment may actually include dropping the traffic or placing this traffic in a Quality of Service ("QOS") queue that has a very low priority.

Encrypted traffic, with the exception of fixed headers, has the peculiar statistical property of being indistinguishable from a strong pseudo-random sequence of the same length. However, if encrypted traffic observed is over a sufficiently long time interval, a very uniform distribution of bits, or octets, occurs which can generally render this traffic distinguishable from non-encrypted traffic. It is precisely this property that allows traffic-shaping hardware to identify encrypted flows, and execute "policy" on those flows. Flows that are not encrypted have a very different statistical distribution of bits (octets) than those flows that are encrypted.

Several tests may be performed on traffic to determine if that traffic has the statistical properties of encrypted traffic. All encrypted traffic will pass those tests, although passing those tests does not necessarily indicate the presence of encryption. For example, traffic flows that have been compressed have long-term statistical properties that are nearly indistinguishable from those of random or encrypted flows.

A common test suite for randomness can usually indicate whether that traffic is encrypted or not. A suite such as that described in Federal Information Processing Standards ("FIPS") 140-2 can reliably distinguish random-looking flows from those that do not appear random, usually with as little as 4 Kbytes of traffic from the flow.

Similarly, over the longer term, attempting to compress the contents of the flow using any one of a number of compression functions can be used to distinguish random-type flows from those flows that are not random. For example, attempting to compress a purely-random flow results in no compression, or even size inflation, depending on the compression algorithm used. Flows that are non-random will tend to be moderately-to-strongly compressible.

There is historical support for the use of steganography to hide secret communications, in such a way that only the sender and the intended recipient even realize there is a hidden message. Thus, it seems natural and tempting to use steganographic techniques to hide the random-looking bits of an encrypted flow inside something that looks statistically non-encrypted.

It has been suggested that some groups hide encrypted messages inside such innocuous objects as digital image files on the Internet, using them as a low-bandwidth communications technique. There are various tools extant that assist in the creation of steganographic materials, using audio, video, and image files as the "carriers" for steganographically-hidden information.

However, the bandwidth efficiency of "traditional" steganography techniques is typically very low, with the "carrier" information dominating the bandwidth used in communicating steganographic objects. Ratios of the carrier information to hidden information on the order of 100:1 or worse are not uncommon using this technique. Nevertheless, an advantage of steganographic techniques is that the resulting data flows have distinctly non-uniform statistical distributions of octets, which means that they are unlikely to be identified as encrypted traffic by automated mechanisms within the Internet.

It is also possible to encode encrypted bit-streams so that they look like, for example, ordinary English text. Techniques such as using a dictionary of common English words to represent groupings of cipher text bits have historically been used to hide the existence of an underlying encrypted message. For example, if groups of four bits are considered at one time, they may be used as an "index" into a short array of English (or German, Spanish, French, etc) words. Those words are substituted for the bit-sequence, and the receiver simply looks up the corresponding bit-sequence when they encounter one of the dictionary items. The technique is quite effective at fooling automated tests for randomness, particularly if those tests are unaware of the existence of the bits-to-English substitution mapping, and if that mapping is sufficiently large.

Problems arise when communication bandwidth efficiency is a strong consideration in the development of a coding system to hide encrypted flows. The system described above, for example, requires substantial overhead to represent 4 bits of "real" information. Typically, between 40 and 50 bits are transmitted in order to represent those 4 bits of actual information.

Many encoding techniques exist that are used to translate binary data into codings that are suitable for highly-constrained channels, such as e-mail ASCII transfer, etc. These codings are relatively bandwidth-efficient, producing a 30% increase in occupied bandwidth. Many protocols in use on the Internet today use some variant of the Base64 coding which translates 24 bits of input data into 32 bits of output data with strong constraints on the output alphabet. However, codings that are based on Base64 can be readily identified in an automated fashion, which means that the encoding can be removed, with the resulting bit-stream further analyzed for randomness.

A key concept in reducing detectability of encrypted flows is to reduce the information density of the encrypted flow. An encrypted data flow appears to be a strong pseudo-random sequence, which means that it has maximal information density, or minimal redundancy. Any technique that reduces the amount of information carried per transmitted bit consequently reduces the probability of detection of the resulting flow as a strong pseudo-random, and therefore, probably an encrypted flow.

Standard encodings, such as Base64 reduce the information carried per transmitted bit. But, because Base64 is easily recognized, it may be decoded and the resulting bit sequence analyzed for randomness. Therefore, what is needed is a system and method of coding that simultaneously reduces the information density of a traffic flow and reduces the probability of detecting the coding scheme so that the traffic is not detected as being encrypted and so that the traffic is not analyzed based on the detection of the coding scheme.

SUMMARY OF THE INVENTION

The present invention advantageously provides a method and system for obscuring the existence of data encrypted traffic in a communication network so that the traffic is not detected as being encrypted and so that the traffic is not analyzed based on the detection of the coding scheme. Generally, encrypted data is further encoded according to a Base64 coding scheme using an alphabet set pseudo-randomly generated based on a set of encryption keys. Advantageously, the members of the encoding alphabet are not actually known.

In accordance with one aspect of the present invention, a method is provided for obscuring the existence of data encryption in a communication network. A set of characters is generated by using a set of encryption keys as an input to a pseudo-random function. Each character corresponds to an index value. Encrypted data is divided into a plurality of parts. Each part is sectioned into a plurality of groups and encoded by mapping each group to a character in the set of characters according to its corresponding index value. The mapped characters are transmitted through the communication network.

In accordance with another aspect of the present invention, a network interface for obscuring the existence of data encryption includes a controller and a communication interface. The communication interface is communicatively coupled to the controller. The controller operates to generate a set of characters by using a set of encryption keys as an input to a pseudo-random function, each character corresponding to an index value. The controller further operates to divide encrypted data into a plurality of parts, section each part of the plurality of parts into a plurality of groups, and encode each part by mapping each group of the plurality of groups to a character in the set of characters according to its corresponding index value. The communication interface operates to transmit the mapped characters through the communication network.

In accordance with yet another aspect of the present invention, a system for obscuring the existence of data encryption in a communication network includes a first network interface and a second network interface. The first network interface operates to generate a set of alphabet characters by using a set of encryption keys as an input to a pseudo-random function, each alphabet character corresponding to an index value. The first network interface further operates to divide encrypted data into a plurality of parts, section each part into a plurality of groups and encode each part by mapping each of the plurality of groups to a character in the set of characters according to its corresponding index value. The first network interface transmits the mapped characters through the communication network. The second network interface operates receive an encoded data message. The encoded data message includes the mapped characters. The second network interface operates to divide the encoded data message into a plurality of groups of characters, map each character to its corresponding index value to recreate the plurality of parts, and decrypt each part of the plurality of parts.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
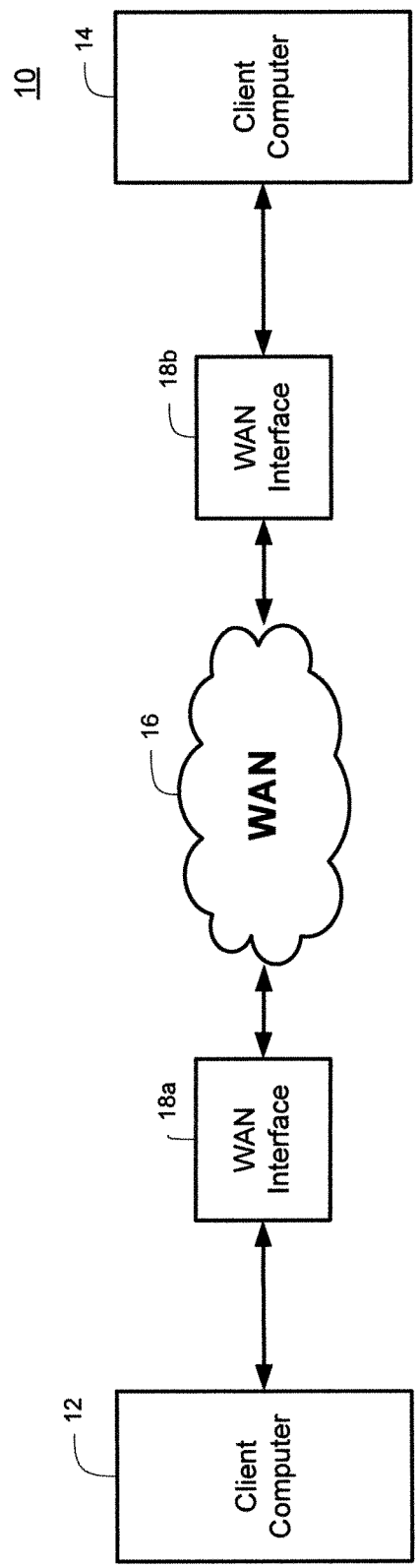
FIG. 1 is a block diagram of an exemplary data encryption obscuring system constructed in accordance with the principles of the present invention.

Before describing in detail exemplary embodiments that are in accordance with the present invention, it is noted that the embodiments reside primarily in combinations of apparatus components and processing steps related to implementing a system and method for obscuring the existence of data encryption in a communication channel while efficiently utilizing the channel bandwidth. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. Additionally, as used herein and in the appended claims, the term "Zigbee" relates to a suite of high-level wireless communication protocols as defined by the IEEE standard 802.15.4. Further, "Wi-Fi" refers to the communications standard defined by IEEE 802.11. The term "WiMAX" means the communication protocols defined under IEEE 802.16. "BLUETOOTH" refers to the industrial specification for wireless personal area network ("PAN") communication developed by the Bluetooth Special Interest Group.

One embodiment of the present invention advantageously provides a method and system for encoding encrypted flows in such a way as to avoid automated detection by various types of randomness tests, including the FIPS 140-2 randomness tests. An embodiment is hardened against some known attacks against the scheme, including using variable ambiguous encoding mechanisms.

Referring now to the drawing figures in which like reference designators refer to like elements, there is shown in FIG. 1 an exemplary data encryption obscuring system 10. System 10 includes a first client computer 12 communicating with a second client computer 14 over a wide area network ("WAN") 16. The wide area network 16 may include the Internet, intranet, or other communication network. Client computers 12, 14 may include personal computers, laptops, personal data assistants ("PDAs"), servers, mobile telephones, etc. Each client computer 12, 14 transmits data through a WAN 16 via a WAN interface 18a, 18b, referred to collectively as WAN interface 18. Although the communication network is pictured in FIG. 1 as being a WAN, the principles of the present invention may also apply to other forms of communication networks, such as personal area networks ("PANs"), local area networks ("LANs"), campus area networks ("CANs"), metropolitan area networks ("MANs"), etc. Additionally, although FIG. 1 shows two client computers, this configuration is for exemplary purposes only. For example, the system 10 may include multiple WAN interfaces 18. The WAN interface 18 can be in communication with various types of client devices, such as routers, switches, etc. Additionally, the WAN interface 18 may be a stand-alone device or may be embedded as part of another resource, such as the client computer 12, 14.

Each WAN interface 18 encrypts data from the client computer 12, 14 according to one or more known encryption schemes. The WAN interface 18 includes an encryption concealer, discussed below, to obscure the fact that the data has been encrypted by encoding the encrypted data using a Base64 coding scheme with a randomly generated alphabet, in contrast to standard Base64 coding which typically involves the use of a single, known alphabet. Each WAN interface 18 also performs the reverse functions whereby the WAN interface 18 receives Base64 encoded and encrypted data frames over the WAN 16, which are then decoded and decrypted, using the randomly generated alphabet, to match the data originally transmitted from the client computer 12, 14. Although each WAN interface 18 in FIG. 1 is shown as being connected to a single client computer 12, 14, an exemplary WAN interface 18 constructed in accordance with the principles of the present invention, may support multiple computers 12, 14 without departing from the scope of the present invention.

Figure 2:
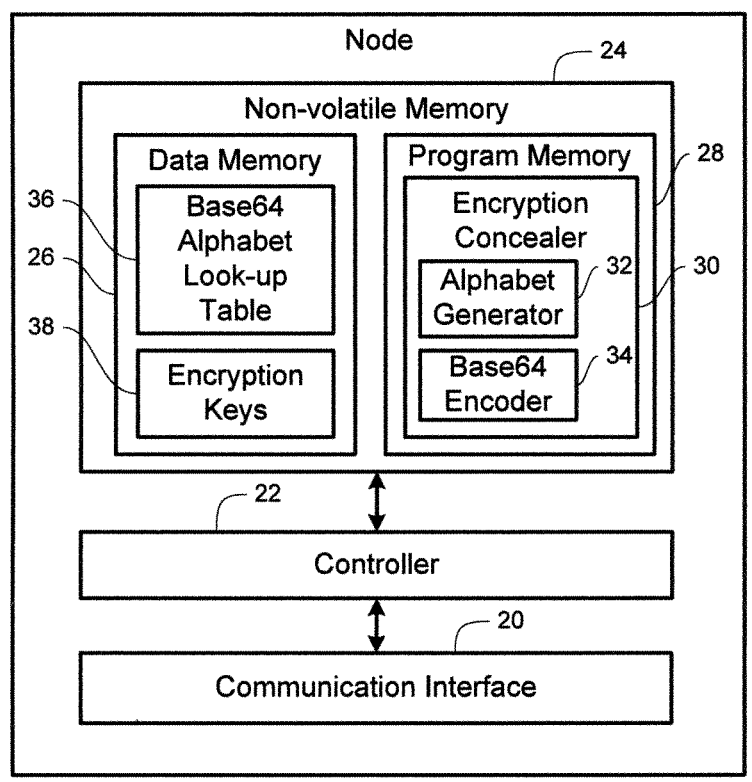
FIG. 2 is a block diagram of an exemplary data encoder constructed in accordance with the principles of the present invention.

Referring now to FIG. 2, an exemplary WAN interface 18 includes a communication interface 20 communicatively coupled to a controller 22. The communication interface 20 may be wired, wireless, or any combination thereof. The communication interface 20 transfers data packets between the WAN interface 18 and other resources of the wide area network 16 using known communication protocols, e.g., Ethernet, Wi-Fi, WiMAX, BLUETOOTH, etc. The communication interface may include any number of communication ports.

The controller 22 controls the processing of information and the operation of the WAN interface 18 to implement the functions described herein. The controller 22 is also coupled to a non-volatile memory 24. The non-volatile memory 24 includes a data memory 26 and a program memory 28. The program memory 28 contains an encryption concealer 30 which obscures the fact that data has been encrypted from automatic detection by other entities connected to the WAN 16, the operation of which is discussed in more detail below. The encryption concealer 30 includes an alphabet generator 32 for randomly generating a sixty-four (64) character Base64 alphabet set from the standard two hundred fifty-six (256) possible ASCII characters and a Base64 encoder 34 which encodes encrypted data according to a Base64 coding scheme using the Base64 alphabet. The data memory 26 stores data files such as a lookup table 36 correlating the Base64 alphabet set with corresponding ASCII characters and a set of encryption keys 38 which are passed between the WAN interface 18 and a destination resource, such as client computer 14, prior to transferring any user data.

In addition to the above noted structures, each WAN interface 18 may include additional, optional structures (not shown) which may be needed to perform other functions of the interface 18.

When using a Base64 coding scheme, a single, standardized, alphabet is generally used to transform input octet triplets into output octet quads, effectively reducing the information density as a fortuitous side-effect. Such codings are designed to get arbitrary binary data through "channels" that may not be transparent to such data. RFC-822 email is one example of such a channel.

In a Base64 scheme, a set of 64 printable characters is chosen from all possible ASCII characters to use as the "coding alphabet." There are a few variants on this alphabet, but only one or two are commonly used. It is important to consider the combinatorics associated with selecting a suitable alphabet for coding binary (and encrypted or random) data. Equation (1) gives the total number of possible alphabets where 64 characters are chosen from a field of 256 characters (8-bit ASCII or UTF-8):

$$P = K!/n!(K!-n!), \qquad (1)$$

where K is the total number of possible octets, e.g., 256, and n is the size of the subset, e.g., 64.

Given the above parameters, there are roughly $10^{61}$ 64-character alphabets when chosen from a field of 256 possible octet values. When considering the information-theoretic aspects of a coding scheme, the ability of the resulting coding to produce purely-printable-ASCII characters is completely unimportant. What is important is that the resulting coding reduces the information density of the resulting flow. Any coding that expands a 24-bit triplet to a 32-bit quad is sufficient to reduce the information density of the resulting flow.

When implementing the present invention, it may be tempting to create a small number of alphabets, or perhaps only one, that are not one of the Base64 alphabets and use these alphabets for coding encrypted flows. But a problem becomes clear immediately with any such scheme: a single, fixed, alphabet is just as susceptible to decoding by "adversaries" as a Base64 scheme. One has to assume that the "adversaries" will become aware of the alphabet(s) used in such a scheme, and treat them exactly the same way as with Base64, described above.

Thus, embodiments of the present invention, in which an alphabet 34 is chosen dynamically, for example, during the creation of a long-term encrypted flow, have superior detection properties to flows that use static alphabets. Additionally, most encrypted communications sessions establish keying material, e.g., encryption keys 38, early in the creation of the session in order to provide shared encryption and integrity keys to the underlying cryptographic "packaging." Some of this keying material may be used to help select dynamic encoding alphabets 34, since such keys 38 are shared by both sides of a communication as a result of establishing an encrypted channel.

Figure 3:
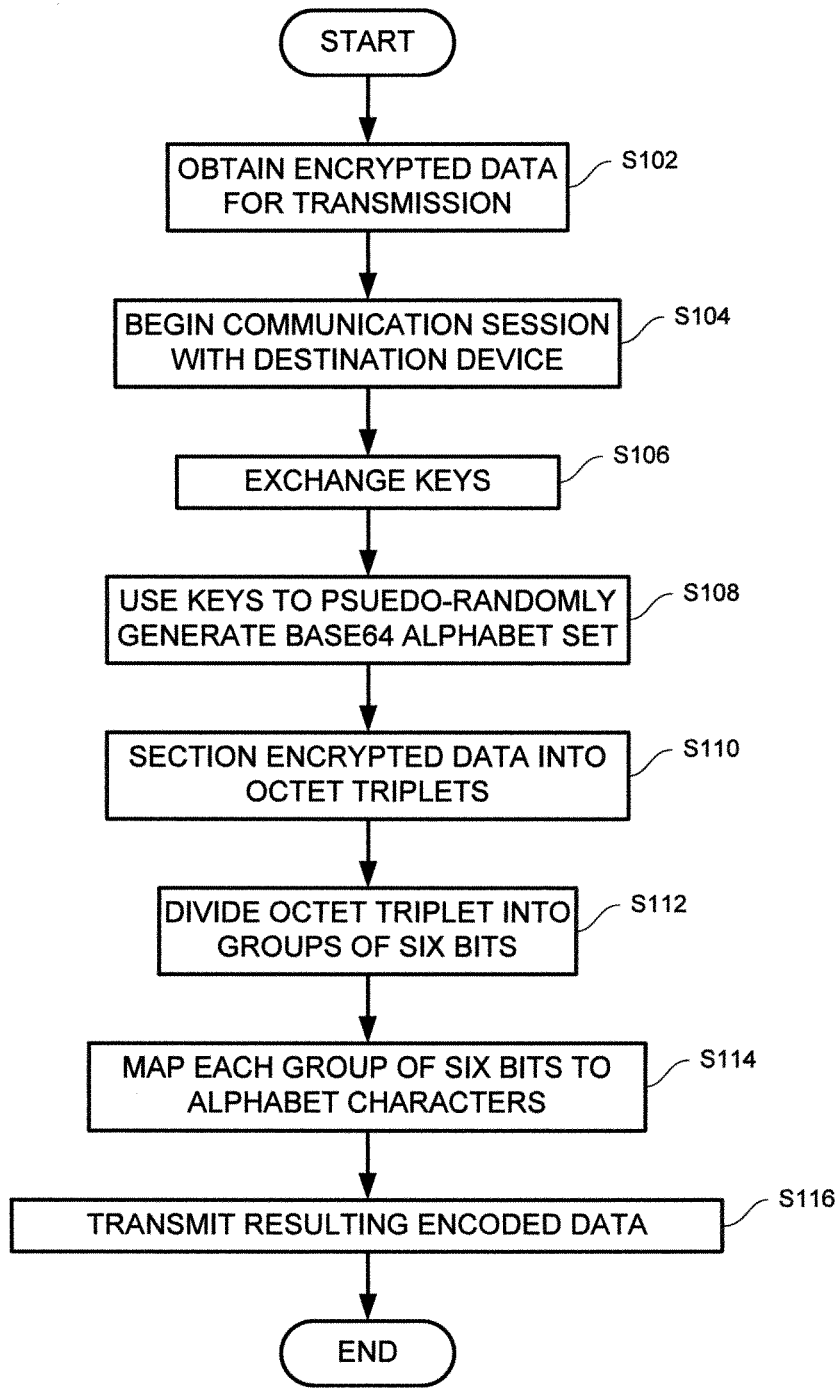
FIG. 3 is a flowchart of an exemplary data encryption obscuring process according to the principles of the present invention.

Referring now to FIG. 3, an exemplary operational flowchart is provided that describes exemplary steps performed by the encryption concealer 30 for obscuring the existence of data encryption. The process begins when the WAN interface 18 determines that encrypted data is available to be transmitted (step S102). The encrypted data may be received from a client computer 12 in an encrypted form or without encryption. In the latter case, the WAN interface 18 may encrypt the data according to known encryption methods.

The WAN interface 18 initiates a secure communication session with a destination device through the communication interface 20 (step S104). As part of the secure communication session initialization, the WAN interface 18 and the destination device exchange keying material (step S106), e.g., encryption keys 38. The encryption keys 38 are used to generate a single pseudo-randomly chosen alphabet of 64 elements selected from a wider field of 256 elements, e.g., the full set of ASCII characters (step S108).

Any strong random number generator may be used to generate the shared coding alphabet, but for purposes of improving interoperability, a standardized cryptographically-strong pseudo-random function is used, so that both sides of a communication derive the same coding alphabet. A suitable algorithm is described in Internet Request For Comments ("RFC") 4615, with the output of the pseudo-random function ("PRF") being the chaining variable for the next call to the PRF, and the required key, K, taken from the shared keying material from session initialization. Example pseudo-code is given in Table 1.

TABLE 1

```
char alphabet[64]
    chain_variable = PRF(K, block-of-16-zeros)
    for x in 1 to 64
    do
        do
            chain_variable = PRF(K, chain_variable)
            c = chain_variable[0]
        while c is already_used
        alphabet[x] = c
    done
```

To begin encoding, in accordance with the present invention, the encrypted data is sectioned into parts such as octet triplets, i.e., 3 parts of 8 bits, (step S110). An input octet triplet part of data is divided into groups of 6 bits (step S112), with those 6 bits used as an index into a table 36 of the sixty-four chosen alphabet elements (step S114). The data is encoded by mapping each group of 6 bits to a corresponding alphabet character using the 6 bits as an index to the lookup table 36 (step S116). The encoded data, i.e., 4 alphabet characters per original octet triplet part, is transmitted through the WAN 16 to the destination device (step S118).

Figure 4:
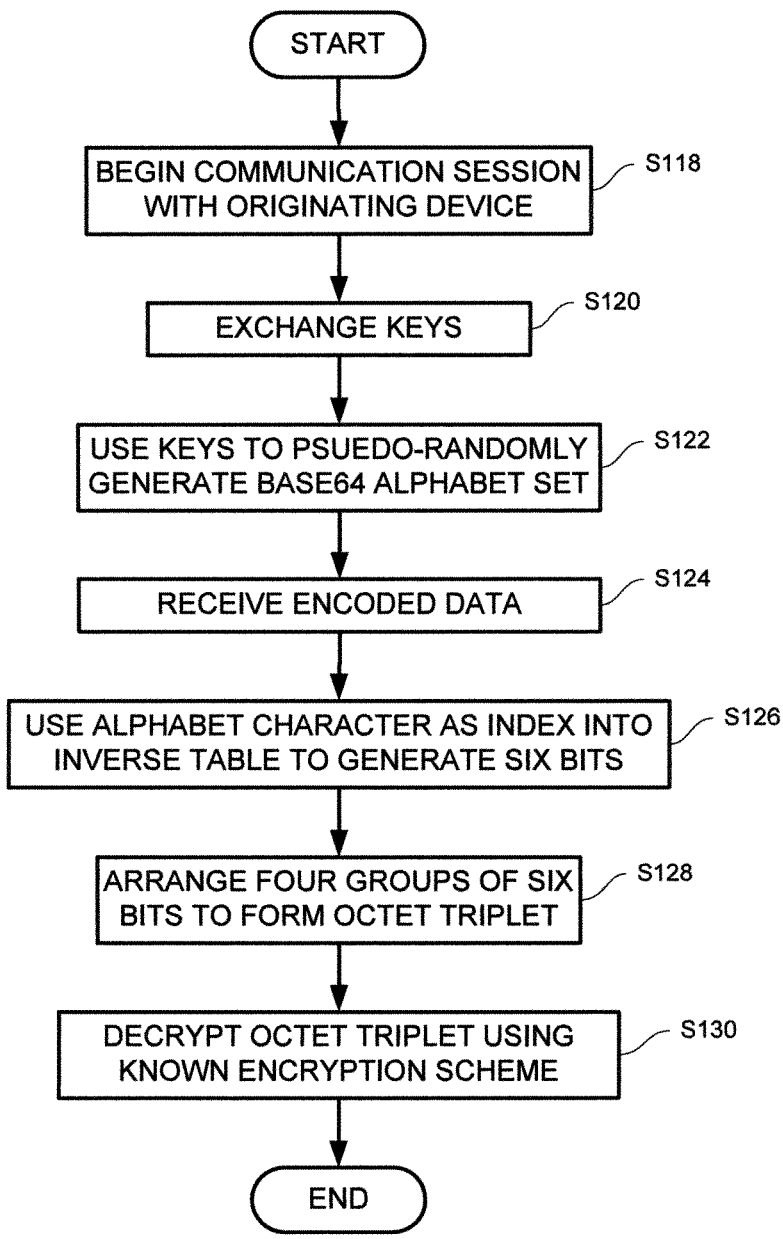
FIG. 4 is a flowchart of an exemplary decoding process in the presence of data encryption obscuring according to the principles of the present invention.

An exemplary operational flowchart is provided in FIG. 4 which describes steps performed by a destination device, such as a receiving WAN interface 18 or client computer 14, upon receiving a data message having its encryption concealed in accordance with the principles of the present invention. The process outlined in FIG. 4 is in large part the method of FIG. 3, performed in reverse. As above, the destination device establishes a secure communication session with the originating device (step S118) and exchanges encryption keys 38 (step S120). The encryption keys 38 are used to pseudo-randomly generate the same Base64 alphabet set that was used to encode the encrypted data (step S122). A so-called "inverse" table can be calculated using, for example, pseudo-code shown in Table 2.

TABLE 2

```
char table[256]
    for x in 1 to 64
    do
        table[alphabet[x]] = x;
    done
```

The destination device receives the encoded data which consists of a series of alphabet characters contained in the pseudo-randomly generated Base64 alphabet set (step S124). On decoding, the alphabet character is used as an index into the inverse table, producing a 6-bit result (step S126). The series of 6 bit results are arranged in groups of 4 to recreate the originally encrypted octet triplet (step S128). The raw data is obtained by decrypting the octet triplet using a known encryption scheme (step S130).

An effect of the above technique is that the input data are effectively encrypted under a mono-alphabetic substitution cipher given by the (secret) alphabet, producing an extra layer of encryption. This technique reliably produces coding schemes that produce data that consistently fail the FIPS 140-2 randomness test.

The redundancy can be increased further by incorporating a subtle bias in the generated alphabet. For example, the generated alphabet can be arranged so that ASCII control characters are less-likely to be chosen as alphabet members, and that the ASCII group "E T A O I N S" and "e t a o i n s" are slightly-more likely to be chosen as alphabet members. This reduces the number of possible alphabets slightly, while decreasing the information density at the same time.

A further improvement in the combinatoric-complexity of "attacks" against the coding scheme may be realized by incorporating multiple randomly-chosen alphabets for the output octet quad. Generating three different alphabets and using different alphabets for the output octet quad work to frustrate any mechanisms that may be used to reliably identify traffic encoded under this scheme. The assignment of alphabets to output quads can either be fixed, such as 1-2-3-1, or can be chosen pseudo-randomly using the same PRF as was used to generate the alphabets. While doing so does not improve the information-theoretic aspects of this system, it helps to increase the combinatoric-complexity of any "attacks" against the system.

An attack against this scheme is considered successful if a third party is able to reliably identify encrypted traffic that is encoded under this scheme. It is useful to consider only those attacks which can be efficiently automated, since those "attacks" are the ones that this scheme is designed to protect against. Considering the example of a Base64 coding scheme, an "attacker" would need to test traffic flows with sufficient depth to guarantee that only characters from a Base64 encoding are being used in the flow, and then to decode the resulting flow, and test the resulting bit-stream for randomness. Note that since Base64 is used to protect many different types of data, not just encrypted data, many of the Base64 trial decodings will result in a "not random" verdict on the part of an automated attacker.

A hypothetical "attack" scenario is that an adversary is in possession of some significant number of all possible coding alphabets produced by this scheme. The "attacker" would need to test a sufficient depth of traffic flow against all the alphabets in his possession before concluding that the traffic was indeed encoded under one of those alphabets. Advantageously, since the attacker cannot determine in advance which alphabet(s) will be used to encode any given flow, it remains a formidable task to reliably distinguish traffic that is encoded under this scheme to any other, non-encrypted, traffic in a typical Internet scenario.

The total number of possible alphabets is, as previously stated, roughly $10^{61}$ possible alphabets. The suggested PRF produces approximately $10^{38}$ states before repeating. So the upper-bound on the number of possible alphabets produced by this scheme, is approximately $10^{38}$. Since each alphabet is 64 bytes in length, storing all $10^{38}$ alphabets requires an impractically-large amount of storage.

A more devastating attack is one that can reliably detect traffic that is encoded with this scheme, but it cannot reliably infer the presence of encrypted data. If an attacker starts with a hypothesis that data under examination has been encoded with this scheme, then they can maintain frequency tables for each octet in an output quad, and after a suitable amount of data has been examined, look for frequency tables in which only 64 of the entries have non-zero counts, across all 4 of the output octets. Maintaining the frequency tables would necessarily be done on a per-flow basis since alphabets are created at the start of a flow. A problem, from the "attack" perspective, is that Base64 and other 24-to-32-bit encoding schemes would also trigger a necessarily-false positive. Since the attacker has only the frequency tables to work with and not the mapping back into 6-bits, he would be unable to unambiguously identify such traffic as having been encrypted, since the traffic cannot be decoded. The only knowledge the attacker has is that each octet is limited to 64 values—which is clearly not a "smoking gun," but rather just a modest hint that the underlying data that is encoded under this scheme may be encrypted data.

The "attack" discussed above in which a Base64-like coding scheme can be reliably detected, even in the presence of random alphabet selection, can be circumvented by using an ambiguous coding scheme in which some of the input 6-bit sequences can be represented by more than 1 output octet. In one such scheme, the degree of "ambiguous" coding can be selected randomly at start of communications, just as the alphabet maps are selected randomly at the start of communications. For each of the 3 alphabets and corresponding reverse maps, some number of extra, e.g., up to 23, code points are generated in the alphabet table, corresponding to up to 23 entries in the alphabet. Thus, the alphabet can be anywhere between 64 and 87 elements in length. When encoding, a random decision is made when coding a 6-bit as to which of two possible encodings to use. The probability of that decision being made could be anything, but in an implemented example, a probability of 50% is used.

The decision as to which entries are to have "ambiguous" codings in the alphabet may also be set dynamically, using the random sequence generator to select an offset within the primary alphabet. Using an ambiguous coding scheme, in which nearly 30% of the 6-bit sequences have ambiguous codings, can strengthen the resulting encrypted flow against detection using the frequency-table analysis described previously.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method of encoding an encrypted input data stream for transmission in a communications network, the method comprising encoding the encrypted input data stream using a substitution cipher to produce an encoded data stream, the encoded data stream having a lower information density than the encrypted input data stream, the lower information density achieved by an encoding that expands a triplet of a first number of bits to quads of a second number of bits.

2. The method of claim 1, wherein the substitution cipher is a monoalphabetic substitution based on a secret alphabet.

3. The method of claim 1, wherein the substitution cipher is a polyalphabetic substitution based on multiple secret alphabets.

4. The method of claim 1, wherein the substitution cipher uses an ambiguous coding scheme in which at least some of the input data is representable by more than one output character.

5. The method of claim 1, wherein the encoded data fails a FIPS 140-2 randomness test.

6. The method of claim 1, wherein further encrypting the encrypted input data stream using the substitution cipher comprises:
    dividing the encrypted input data stream into a plurality of groups; and
    mapping each group to a character in a set of characters.

7. The method of claim 6, wherein the set of characters can be derived from a set of encryption keys using a pseudorandom function.

8. A method of decoding an encoded encrypted data stream received over a communications network, the method comprising:
    using a substitution cipher to decode the encoded encrypted data stream to produce a decoded encrypted data stream, the encoded encrypted data stream having an information density achieved by an encoding that expands a triplet of a first number of bits to quads of a second number of bits.

9. The method of claim 8, wherein the encoded encrypted data stream comprises characters in a set of characters, the method comprising further mapping each character to a group of bits of the decoded encrypted data stream.

10. The method of claim 9, wherein the substitution cipher is an alphabetic substitution based on at least one secret alphabet.

11. An encoder for encoding an encrypted input data stream for transmission in a communications network, the encoder comprising:
- at least one controller; and
- at least one memory storing instructions executable by the controller to encode the encrypted input data stream using a substitution cipher to produce an encoded data stream, the encoded data stream having a lower information density than the encrypted input data stream, the lower information density achieved by an encoding that expands a triplet of a first number of bits to quads of a second number of bits.

12. The encoder of claim 11, wherein the substitution cipher is a monoalphabetic substitution based on a secret alphabet.

13. The encoder of claim 11, wherein the substitution cipher is a polyalphabetic substitution based on multiple secret alphabets.

14. The encoder of claim 11, wherein the substitution cipher is operable to use an ambiguous coding scheme in which at least some of the input data can be represented by more than one output character.

15. The encoder of claim 11, wherein the substitution cipher is operable to produce encoded data that fails a FIPS 140-2 randomness test.

16. The encoder of claim 11, wherein instructions executable to further encrypt the encrypted input data stream using the substitution cipher further comprise instructions executable to:
- divide the encrypted input data stream into a plurality of groups; and
- map each group to a character in a set of characters.

17. The encoder of claim 16, wherein the set of characters can be derived from a set of encryption keys using a pseudo-random function.

18. A decoder for decoding an encoded encrypted data stream received over a communications network, the decoder comprising:
- at least one controller; and
- at least one memory storing instructions executable by the controller to decode the encoded encrypted data stream using a substitution cipher to produce a decoded encrypted data stream, the encoded encrypted data stream having an information density achieved by an encoding that expands a triplet of a first number of bits to quads of a second number of bits.

19. The decoder of claim 18, wherein the encoded encrypted data stream comprises characters in a set of characters, the instructions executable to decode the encode and encrypted data stream further comprising instructions executable to map each character to a group of bits of the decoded encrypted data stream.

20. The decoder of claim 19, wherein the substitution cipher is an alphabetic substitution based on at least one secret alphabet.

21. A method of transmitting an encrypted data stream over a communications network, comprising:
- encoding an encrypted input data stream using a substitution cipher to produce an encoded data stream, the encoded data stream having a lower information density than the encrypted input data stream, the lower information density achieved by an encoding that expands a triplet of a first number of bits to quads of a second number of bits;
- transmitting the encoded data stream over the communications network; and
- decoding the encoded data stream using a substitution cipher inverse to the substitution cipher used for the encoding to recover the encrypted input data stream.

22. The method of claim 21, wherein the substitution cipher is a monoalphabetic substitution based on a secret alphabet.

23. The method of claim 21, wherein the substitution cipher is a polyalphabetic substitution based on multiple secret alphabets.

24. The method of claim 21, wherein the substitution cipher used for the encoding uses an ambiguous coding scheme in which at least some of the input data can be represented by more than one output character.

25. The method of claim 21, wherein the substitution cipher is operable to produce encoded data that fails a FIPS 140-2 randomness test.

* * * * *